US011400856B2

(12) United States Patent
Shitara et al.

(10) Patent No.: US 11,400,856 B2
(45) Date of Patent: Aug. 2, 2022

(54) SENSOR LAMP UNIT FOR AUTOMATIC DRIVE VEHICLE

(71) Applicant: Toyota Jidosha Kabushiki Kaisha, Toyota Aichi-ken (JP)

(72) Inventors: Masaki Shitara, Nagakute (JP); Yuchi Yamanouchi, Toyota (JP); Ryo Hattori, Kariya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 114 days.

(21) Appl. No.: 16/929,684

(22) Filed: Jul. 15, 2020

(65) Prior Publication Data

US 2021/0016703 A1 Jan. 21, 2021

(30) Foreign Application Priority Data

Jul. 19, 2019 (JP) .............................. JP2019-133541

(51) Int. Cl.
*B60Q 1/00* (2006.01)
*B60R 11/04* (2006.01)
*G01S 7/481* (2006.01)
*G01S 17/86* (2020.01)
*B60Q 1/34* (2006.01)
*G01S 17/931* (2020.01)

(52) U.S. Cl.
CPC .......... *B60Q 1/0023* (2013.01); *B60Q 1/346* (2013.01); *B60R 11/04* (2013.01); *G01S 7/4813* (2013.01); *G01S 17/86* (2020.01); *G01S 17/931* (2020.01)

(58) Field of Classification Search
USPC ....................................................... 348/148
See application file for complete search history.

(56) References Cited

U.S. PATENT DOCUMENTS

| 2006/0209190 | A1* | 9/2006 | Walters ................ H04N 7/181 348/148 |
| 2008/0122597 | A1* | 5/2008 | Englander ............ B60Q 5/006 340/433 |
| 2018/0253630 | A1* | 9/2018 | Tamer ................... H04N 5/228 |
| 2019/0202355 | A1* | 7/2019 | Tatara ............... G06K 9/00791 |
| 2019/0225060 | A1* | 7/2019 | Sannohe ............... B60Q 1/323 |
| 2019/0248383 | A1* | 8/2019 | Maruta ............... H04N 21/214 |
| 2019/0265703 | A1* | 8/2019 | Hicok ................... G06Q 50/30 |
| 2020/0372258 | A1* | 11/2020 | Kobayashi ......... G06K 9/00221 |
| 2020/0384923 | A1* | 12/2020 | Sawada ................. B60R 11/04 |
| 2021/0188172 | A1* | 6/2021 | Han ...................... B60R 1/062 |
| 2021/0279477 | A1* | 9/2021 | Tsunashima ............. B60R 1/00 |

FOREIGN PATENT DOCUMENTS

| CN | 106515556 | * | 3/2017 | ............. B60Q 1/00 |
| CN | 209079735 U | * | 7/2019 | ............. B60P 3/00 |
| WO | 2011105710 | * | 9/2011 | ............. B60Q 1/34 |
| WO | 2018030285 A1 | | 2/2018 | |

* cited by examiner

Primary Examiner — Behrooz M Senfi
(74) Attorney, Agent, or Firm — Dinsmore & Shohl LLP

(57) ABSTRACT

A sensor lamp unit is attached to an automatic drive vehicle. The sensor lamp unit includes a turn lamp portion in which a turn lamp is built in, a lidar portion in which a lidar which is an active type sensor device is built in, and a camera portion in which a camera which is a passive type sensor device is built in. The turn lamp portion, the lidar portion, and the camera portion are aligned in an up-and-down direction. The sensor lamp unit is attached on left and right side walls of the automatic drive vehicle, in an outward orientation.

20 Claims, 8 Drawing Sheets

SENSOR LAMP UNIT FOR AUTOMATIC DRIVE VEHICLE

CROSS REFERENCE TO RELATED APPLICATION

This application claims priority to Japanese Patent Application No. 2019-133541 filed on Jul. 19, 2019, which is incorporated herein by reference in its entirety including the specification, claims, drawings, and abstract.

TECHNICAL FIELD

The present disclosure relates to a sensor lamp unit provided in an automatic drive vehicle.

BACKGROUND

An automatic drive vehicle having an automated driving function, in general, is equipped with sensor devices such as a camera, a lidar, or the like, and the vehicle travels while detecting obstacles around the vehicle.

WO 2018/030285 discloses a structure in which cameras are provided in turn lamps at respective sides of the vehicle, and lidars are provided within rear lamps at a rear side of the vehicle.

The camera and the lidar have different measurement principles, and, consequently, can acquire different information. However, in WO 2018/030285 described above, because the camera and the lidar are provided at different positions, fields of view of the camera and the lidar significantly differ from each other. Because of this, for example, it becomes difficult to use detected information in an integrated manner or in a complementary manner. On the other hand, simply placing the camera and the lidar close to each other would result in disadvantages such as narrowing of the fields of view of the camera and the lidar.

An advantage of the present disclosure lies in proposing a new form of placing a passive type sensor device such as a camera and an active type sensor device such as a lidar near each other in an automatic drive vehicle.

SUMMARY

According to one aspect of the present disclosure, there is provided a sensor lamp unit for an automatic drive vehicle, comprising: a passive type sensor device that detects an electromagnetic wave from outside and that acquires image data; an active type sensor device that detects a reflected wave of an electromagnetic wave which is irradiated, and that acquires detection data; and a turn lamp, wherein the passive type sensor device, the active type sensor device, and the turn lamp are placed and aligned in an up-and-down direction, and are attached on an outer surface of each of left and right side walls of the vehicle.

According to another aspect of the present disclosure, the automatic drive vehicle comprises: a first front side window provided at an upper part of each of the left and right side walls; a second front side window provided on each of the left and right side walls, at a position below a lower end of the first front side window, and at a front side in relation to a rear end of the first front side window; and a slide door provided on at least one of the side walls and which slides in a front-and-rear direction, and the sensor lamp unit is provided, on a side on which the slide door is provided, at a position below the lower end of the first front side window, at a rear side in relation to a rear end of the second front side window, and at a front side in relation to a front end of the slide door when the slide door is slid forward.

According to another aspect of the present disclosure, the automatic drive vehicle comprises: a first rear side window provided at an upper part of each of the left and right side walls; a second rear side window provided on each of the left and right side walls, at a position below a lower end of the first rear side window, and at a rear side in relation to a front end of the first rear side window; and a slide door provided on at least one of the side walls and which slides in a front-and-rear direction, and the sensor lamp unit is provided, on a side on which the slide door is provided, at a position below the lower end of the first rear side window, at a front side in relation to a front end of the second rear side window, and at a rear side in relation to a rear end of the slide door when the slide door is slid rearward.

According to another aspect of the present disclosure, a fender having an expanded portion formed in an arch shape along an outline of a wheel is provided on the side wall, below the second front side window or the second rear side window, and the sensor lamp unit is provided above the expanded portion.

According to another aspect of the present disclosure, an operation portion for an operator is provided inside the automatic drive vehicle, near the first front side window on the side wall on which the slide door is provided, and the sensor lamp unit is provided at a position which at least partially overlaps the operation portion in the front-and-rear direction of the vehicle.

According to another aspect of the present disclosure, the passive type sensor device is a camera which acquires visible image data, and is provided at a position where an outer surface of the slide door can be imaged, on a side, of the automatic drive vehicle, on which the slide door is provided.

According to another aspect of the present disclosure, the turn lamp is provided at an uppermost part, the passive type sensor device is provided at a lowermost part, and the active type sensor device is provided at an upper part adjacent the passive type sensor device.

According to another aspect of the present disclosure, the sensor lamp unit comprises a single housing.

According to another aspect of the present disclosure, a discharge hole for discharging water entering through a gap between the active type sensor device and the housing is formed on the housing.

According to another aspect of the present disclosure, the passive type sensor device is a camera which acquires visible image data for an electronic mirror in the automatic drive vehicle.

According to another aspect of the present disclosure, the image data acquired by the passive type sensor device and the detection data acquired by the active type sensor device are integrated and used for a detection process of an obstacle around the vehicle.

In the sensor lamp unit, the passive type sensor device and the active type sensor device are placed close to each other, and, in both sensor devices, influences on a horizontal field of view of the sensor device by the other sensor device can be resolved or reduced.

BRIEF DESCRIPTION OF DRAWINGS

Embodiment(s) of the present disclosure will be described based on the following figures, wherein.

DESCRIPTION OF EMBODIMENTS

Embodiments of the present disclosure will now be described with reference to the drawings. In the explanation, in order to facilitate understanding, a specific configuration will be described. The described specific configuration, however, is merely exemplary of the embodiments, and various other configurations are also possible.

Figure 1:
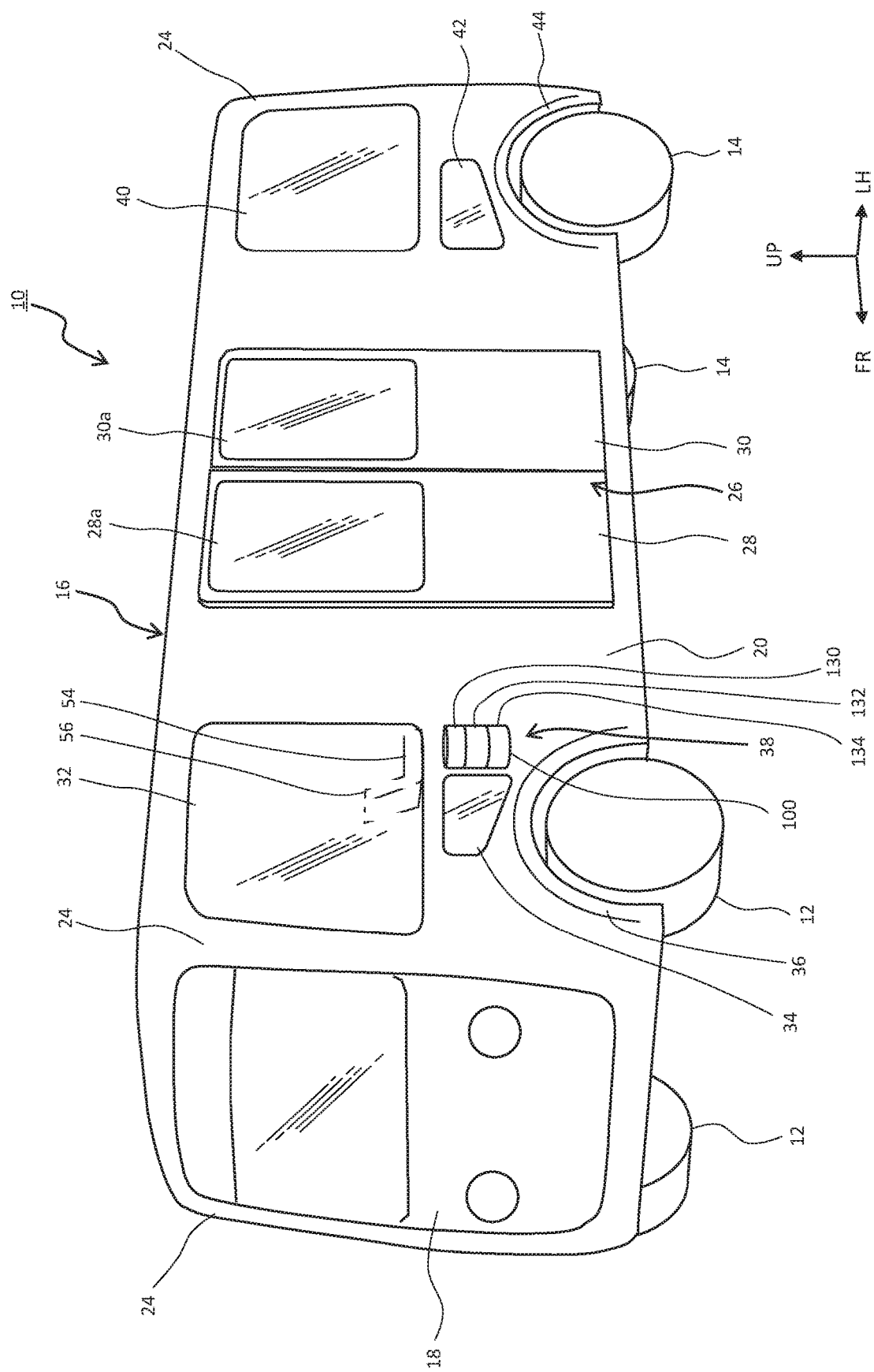
FIG. 1 is a perspective diagram of an automatic drive vehicle of a first embodiment of the present disclosure in a state in which a loading/unloading port is closed.
Figure 2:
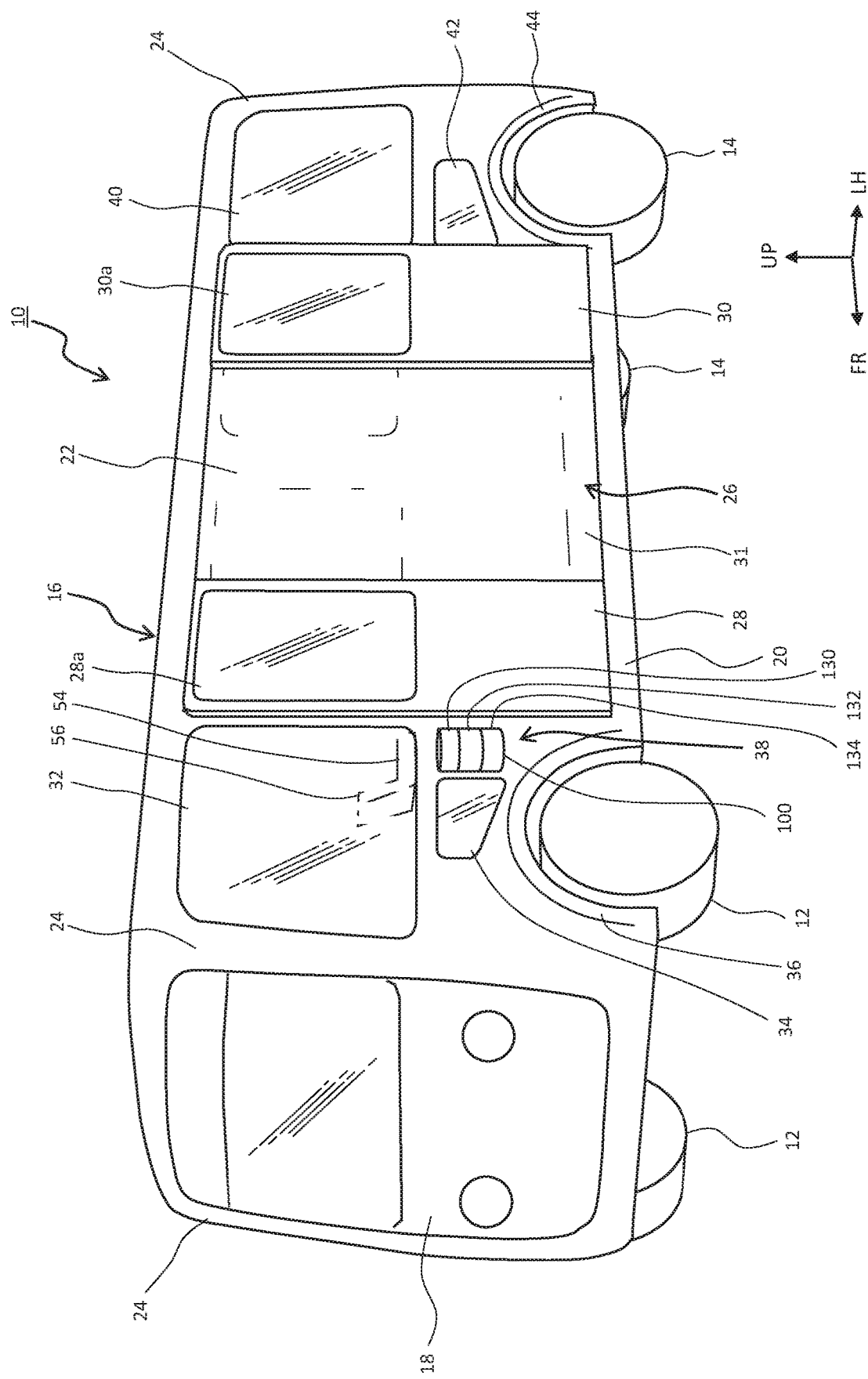
FIG. 2 is a perspective diagram of the automatic drive vehicle in a state in which the loading/unloading port is opened.

FIGS. 1 and 2 are schematic perspective diagrams showing an outer appearance of an automatic drive vehicle 10 according to an embodiment of the present disclosure. In the figures, an FR axis in the coordinate system shows a front direction of the vehicle, an UP axis shows an upward direction, and an LH axis shows a left-hand direction when viewing the front direction (the directions are similarly applicable in the other drawings).

In the present embodiment, as the automatic drive vehicle 10, a bus which is shared by an unspecified large number of passengers is considered. The automatic drive vehicle 10 travels, for example, within a particular site along a predefined route at a relatively low speed (for example, 30 km/h), and stops at bus stops on the route, for loading and unloading passengers. FIG. 1 shows the automatic drive vehicle 10 in a traveling state, in which a loading/unloading port 26 is closed. FIG. 2 shows a state in which the automatic drive vehicle 10 is stopped, and the loading/unloading port 26 is opened, to enable loading and unloading of passengers.

The automatic drive vehicle 10 is a four-wheel vehicle on which a pair of front wheels 12 and a pair rear wheels 14 are provided. A body 16 is formed in an approximate rectangular parallelepiped shape, approximately symmetric in the front-and-rear and left-and-right directions. FIG. 1 shows a front wall 18 and a left side wall 20 forming surfaces of the rectangular parallelepiped, and FIG. 2 additionally shows a right side wall 22. The front wall 18, the side walls 20 and 22, and a rear wall 23 (refer to FIG. 3) are formed in the most part with steel plates and windows made of resin plates (windows). In addition, on the body 16, at four corners in the plan view, pillars 24 are provided, which extend in the up-and-down direction.

At a center part of the left side wall 20, the loading/unloading port 26 of the automatic drive vehicle 10 is provided. Near the loading/unloading port 26, a front slide door 28 and a rear slide door 30 which are a pair of slide doors are provided. A lower part of the front slide door 28 is covered by a steel plate, and, at an upper part of the front slide door 28, a front slide door window 28a which is a window is provided. Similarly, the rear slide door 30 has a steel plate at a lower part thereof, and a rear slide door window 30a at an upper part thereof. When the loading/unloading port 26 is closed, the front slide door 28 slides rearward, and the rear slide door 30 slides forward, so that a rear end surface of the front slide door 28 and a front end surface of the rear slide door 30 contact each other, and the state as shown in FIG. 1 is realized. When the loading/unloading port 26 is opened, the front slide door 28 slides forward, and a front end thereof reaches an area near a rear end of a first left front side window 32. In addition, the rear slide door 30 slides rearward, and reaches an area near a front end of a first left rear side window 40. As a result, the state as shown in FIG. 2 is realized, and the passengers can board or get off the bus through the loading/unloading port 26. In FIG. 2, the inside of the vehicle visible through the loading/unloading port 26, only a floor 31 and the right side wall 22 are schematically shown, but in reality, seats for the passengers or the like, which are omitted from FIG. 2, are provided (refer to FIGS. 3 and 4). Further, although the illustration is omitted, a ramp is stored below the floor 31, by which the floor 31 and the ground can be smoothly connected at the loading/unloading port 26. By placing the ramp, loading/unloading can be facilitated for passengers who are in wheelchairs, elderly passengers, disabled passengers, and the like.

On the left side wall 20, the first left front side window 32 which is a large quadrangular window is provided at a front part and an upper part. Through the left front side window 32, an armrest 54 and a touch panel 56 which are operation portions provided in the vehicle can be viewed. The armrest will be described later. Below a lower end of the first left front side window 32 on the side wall 20, a second left front side window 34 which is a small, approximate-trapezoidal window is provided. A rear end of the second left front side window 34 is positioned at a front side in relation to a rear end of the first left front side window 32. On the side wall 20, at a lower part of the second left front side window 34 a fender for the left front wheel 12 is formed. On the fender, an expanded portion 36 which is formed in an arch shape along an outline of the front wheel 12 is provided. The expanded portion 36 refers to a portion which is slightly expanded toward an outer side in the vehicle width direction, as compared to other, general portions of the side wall 20.

The word "first" in the first left front side window 32 and the word "second" in the second left front side window 34 are only for identifying these elements, and do not indicate a particular ranking. Further, the expression "left front" means that the window is the first side window or the second side window positioned at a left and front side of the automatic drive vehicle 10. In the present specification, similar to the expression "left front", other positions may be referred to such as "front", "rear", "left rear", or the like.

Moreover, as shown in FIGS. 1 and 2, the first side window (for example, the first left front side window 32) and the second side window (for example, the second left front side window 34) may be formed as separate side windows, or alternatively, may be formed as a connected side window. When the side windows are formed as the connected window, a part at the upper portion is referred to as the first side window, and a part protruding from the lower part of the first side window in the downward direction is referred to as the second side window.

On the left side wall 20, there exists a region 38 (refer also to FIG. 6), defined at a front side in relation to the front end of the front slide door 28 in the opened state, below the lower end of the first left front side window 32, at a rear side in relation to the rear end of the second left front side window 34, and above the expanded portion 36 of the fender. The region 38 in the side wall 20 is formed from a flat outer surface made of the steel plate, and a sensor lamp unit 100 is provided on the outer surface. The sensor lamp unit 100 comprises a turn lamp portion 130, a lidar portion 132, and a camera portion 134. The sensor lamp unit 100 is a component in which the sensor and the lamp are combined, and thus is given this name. The sensor lamp unit 100 will be described later in detail.

A structure of a rear part of the left side wall 20 is similar to the structure of the front part of the side wall 20. Specifically, the first left rear side window 40 is provided at a rear part and an upper part of the side wall 20, and a second left rear side window 42 is provided below the first left rear side window 40. An expanded portion 44 of the fender is also provided below the second left rear side window 42. However, in the example configuration shown in FIGS. 1 and 2, the second left rear side window 42 is formed longer in the front-and-rear direction than is the second left front side window 34. Because of this, there is no region in the rear part of the side wall 20 corresponding to the region 38 of the front part, and the sensor lamp unit 100 is not provided on the rear part.

Although not illustrated, on the right side wall 22, the loading/unloading port 26, the front slide door 28, and the rear slide door 30 are not provided, and in place of these elements, a steel plate and a resin plate are provided. The structure of the right side wall 22 other than these elements is basically similar to that of the left side wall 20. That is, on the right side wall 22, on the front part, a first right front side window, a second right front side window, and an expanded portion of a front wheel fender are provided, and, on the rear part, a first right rear side window, a second right rear side window, and an expanded portion of a rear wheel fender are provided. Further, on the front part of the right side wall 22, the sensor lamp unit 100 similar to that on the left side wall 20 is provided, at a position symmetric in the left-and-right direction with respect to the left side wall 20.

Figure 3:
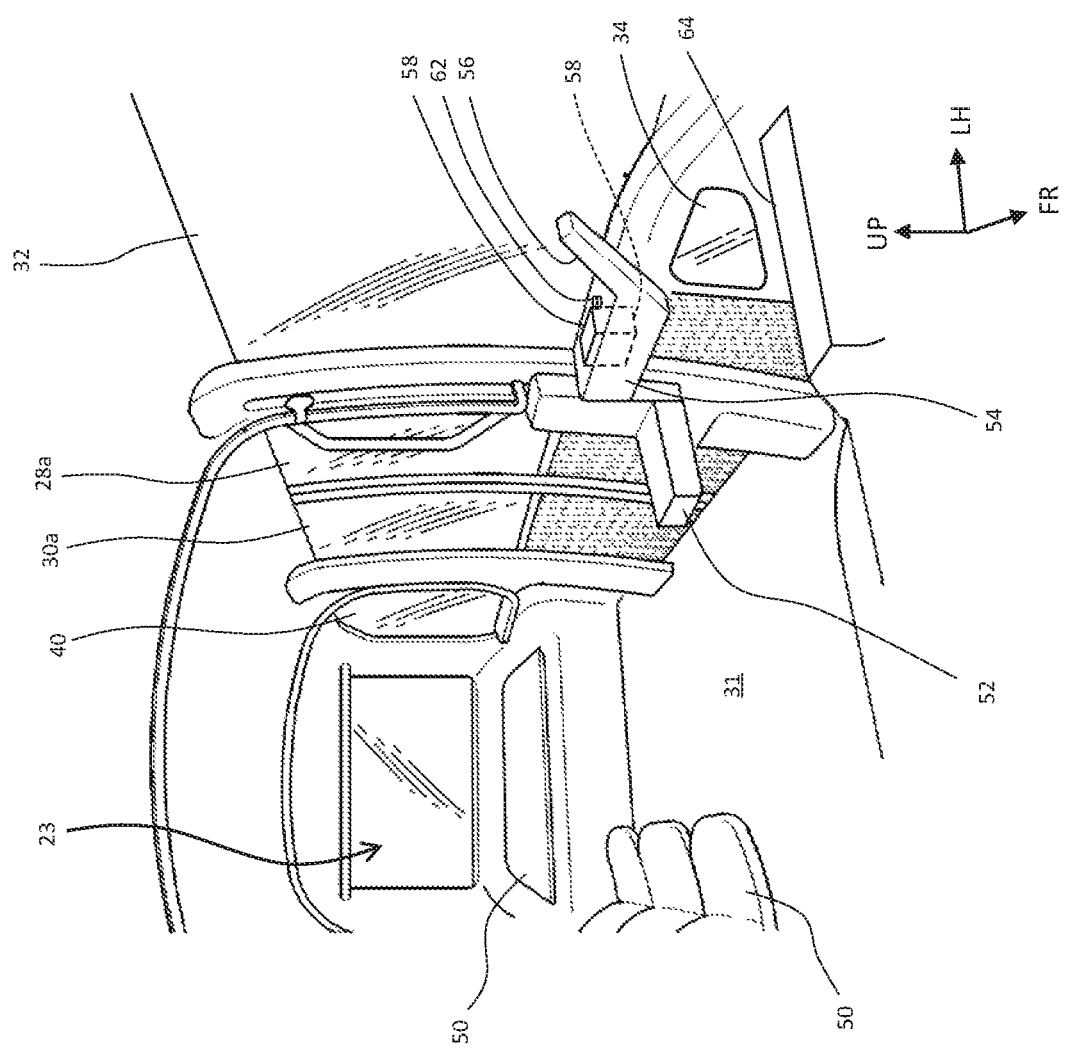
FIG. 3 is a diagram showing an inside of the automatic drive vehicle.
Figure 4:
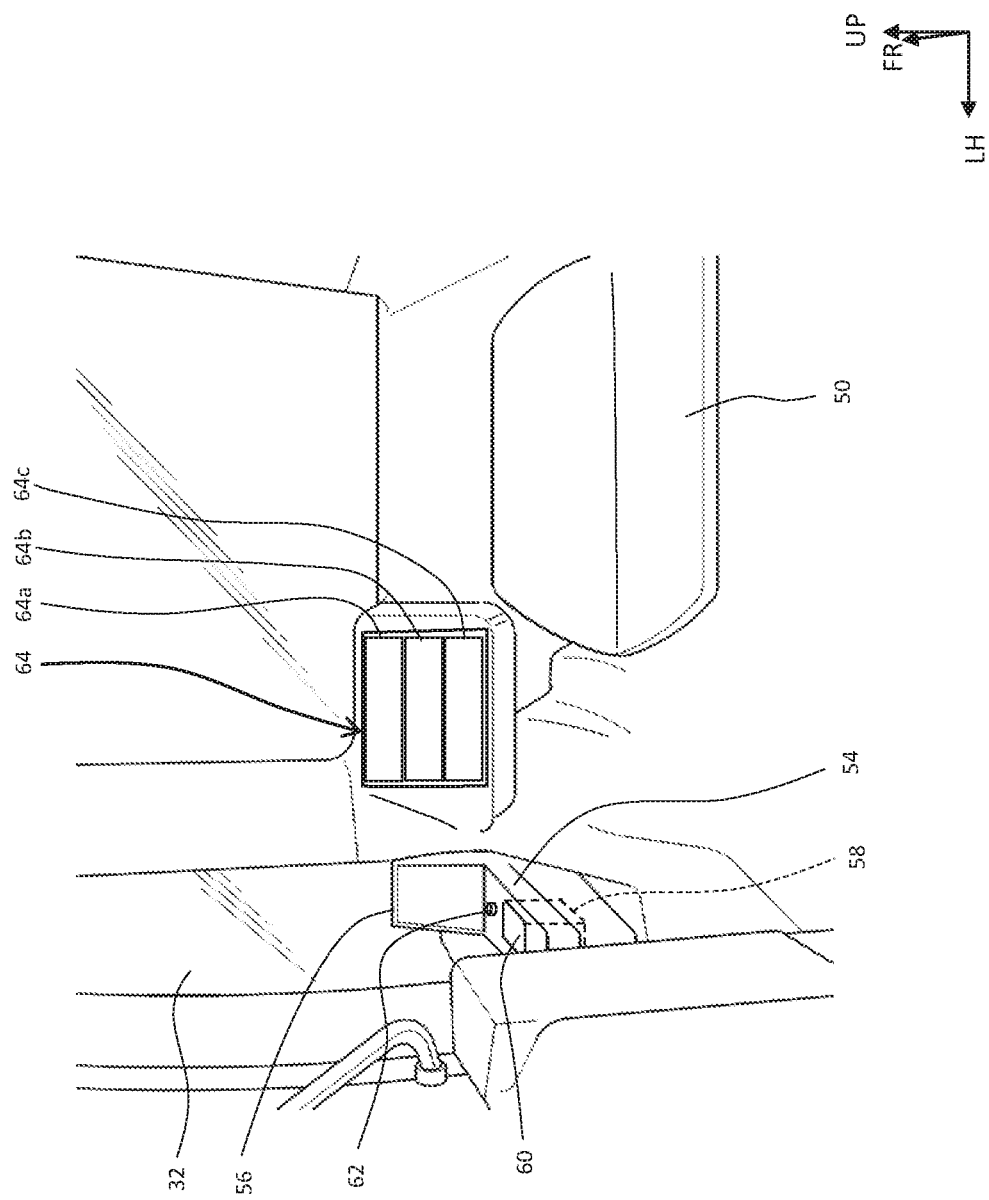
FIG. 4 is a diagram showing an inside of the automatic drive vehicle, viewed from another angle.

Next, with reference to FIGS. 3 and 4, an inside of the automatic drive vehicle 10 will be described. FIGS. 3 and 4 are perspective diagrams schematically showing the structure in a vehicle cabin of the automatic drive vehicle 10. As already described, the automatic drive vehicle 10 is used as a bus, and thus, the floor 31 at the center in the vehicle cabin is a space for passengers to ride the vehicle in a standing state or a space for placing a wheelchair for passengers on the wheelchair. In addition, near the front wall 18, the rear wall 23, and the right side wall 22, passenger seats 50 are provided.

In the automatic drive vehicle 10, an operator seat 52 for an operator is provided. The operator seat 52 is a foldable seat, and in FIG. 3, the operator seat 52 is opened and is set in a state to allow sitting on the seat. The operator seat 52 is provided near an area between a rear end of the first left front side window 32 and the front end of the front slide door 28 in the closed state.

On a left front side of the operator seat 52, the armrest 54 is provided for the operator sitting on the operator seat 52 to place his/her arm for operation. The armrest 54 is placed near the lower end and the rear end of the first left front side window 32.

On a front end of the armrest 54, the touch panel 56 extending from an upper surface of the armrest 54 in the upward and front direction is provided. On the touch panel 56, buttons for the operator to execute a command of drive control such as starting to move and stopping in the automatic drive mode are provided, and in addition, buttons for sending commands to various devices (a turn signal, a horn, a headlight, an air conditioner, a wiper, or the like) in the automatic drive vehicle 10 are also provided. The operator sits on the operator seat 52 and operates the touch panel 56 with his/her hand while placing his/her arm on the armrest 54, so that the operator can command the drive control and input commands to various devices.

On the upper surface of the armrest 54, a lid 60 is provided, and inside the lid 60, a storage portion 58 is provided. The storage portion 58 stores a mechanical operation portion for the operator to input drive control commands in a manual drive mode of the automatic drive vehicle 10. In a state in which the lid 60 is closed, the upper surface of the armrest 54 is flat. When the lid 60 is opened and the mechanical operation portion is pulled up, the mechanical operation portion is set on the upper surface of the armrest 54.

In addition, on the upper surface of the armrest 54, an emergency stop button 62 of a mechanical type for inputting an emergency stop command for the automatic drive vehicle 10 by a manual operation is also provided. The button of the mechanical type refers to a button which physically exists, instead of a button displayed by a program such as the touch panel 56. When the operator presses the emergency stop button 62, the emergency stop button 62 transmits an emergency stop signal converted into an electrical signal to the drive control device, to stop the automatic drive vehicle 10.

As described, the armrest 54 and the touch panel 56 are portions in which buttons to be operated by the operator or like are placed, and may be referred to as an operation portion in the automatic drive vehicle 10. As will be described below, the sensor lamp unit 100 is placed at a position overlapping the operation portion, as viewed in the front-and-rear direction of the vehicle.

At a right and front side of the touch panel 56, a display 64 which displays information related to the automatic drive vehicle 10 is provided. The display 64 is placed in a manner to be arranged on a right side of the touch panel 56, when viewed from the operator sitting on the operator seat 52. In the example configuration shown in FIG. 4, a display on the display 64 is divided into three regions in the up-and-down direction. An upper region 64a and a middle region 64b are intended as electronic mirrors. For example, on the upper region 64a, an image in front of the vehicle or an image behind the vehicle is displayed in a switchable manner. On the middle region 64b, the image behind the vehicle and images of the sides of the vehicle are combined and displayed. The images of these electronic mirrors are acquired from cameras attached to the automatic drive vehicle 10, and the image on the side of the vehicle is captured by a camera built in the camera portion 134 of the sensor lamp unit 100 described above. On a lower region 64c of the display 64, information such as, for example, vehicle speed, outside temperature, a next bus stop, or the like is displayed.

The automatic drive function of the automatic drive vehicle 10 will now be briefly described. The automatic drive vehicle 10 may be driven with a plurality of drive modes including an automatic drive mode and a manual drive mode. The automatic drive mode is a drive mode in which the drive control is primarily executed by a computer. The drive control includes shift change control, vehicle speed control, or steering control. The vehicle speed control includes travel-starting control, stop control, and acceleration/deceleration control of the automatic drive vehicle 10. In the automatic drive mode, detection results of various sensors including the sensors provided on the sensor lamp unit 100 are used by the computer to control driving of the automatic drive vehicle 10. In the automatic drive mode, for example, control related to loading and unloading of the passengers such as, for example, opening and closing of the loading/unloading port 26 and placement and storage of the ramp can also be automatically executed. In the automatic drive mode also, the operator riding the automatic drive vehicle 10 may operate the touch panel 56 which is the operation portion, to command, for example, start of travel from the stopped state or to command control related to loading and unloading of the passengers. Alternatively, in place of the operator, a management sensor at a remote location may execute the command for starting to travel and the command for control related to loading and unloading of the passengers.

The manual drive mode is a mode in which the automatic drive vehicle 10 is not automatically driven, and the operator riding the automatic drive vehicle 10 controls the driving of the automatic drive vehicle 10. The operator executes the manual drive operation of the automatic drive vehicle 10 through the mechanical operation portion taken out from the armrest 54.

The operator refers to a person who rides the automatic drive vehicle 10 and engages in control of the automatic drive vehicle 10. In the automatic drive mode, the driving is controlled primarily by the management center or the automatic drive vehicle 10 itself, and thus, there is only a few opportunities in which the operator controls the driving. However, the operator can command operations such as, for example, starting of the travel of the vehicle or stopping of the vehicle, and may be considered to engage in the control of the automatic drive vehicle 10. In the manual drive mode, the operator acts as a driver who directly executes the driving operation of the automatic drive vehicle 10, and actively engages in the control of the automatic drive vehicle 10.

In the present embodiment, a configuration is considered in which the automatic drive vehicle 10 is an electricity-driven vehicle having a drive motor which receives supply of electric power from a battery. The battery is a secondary battery which can be charged and discharged, and is periodically charged by an external electric power. The electricity-driven vehicle includes a hybrid electric vehicle equipped with an engine and the drive motor as prime motors. Further, the electricity-driven vehicle includes hydrogen-fueled automobiles in which the drive motor is driven by electric power generated by a fuel cell.

Figure 5:
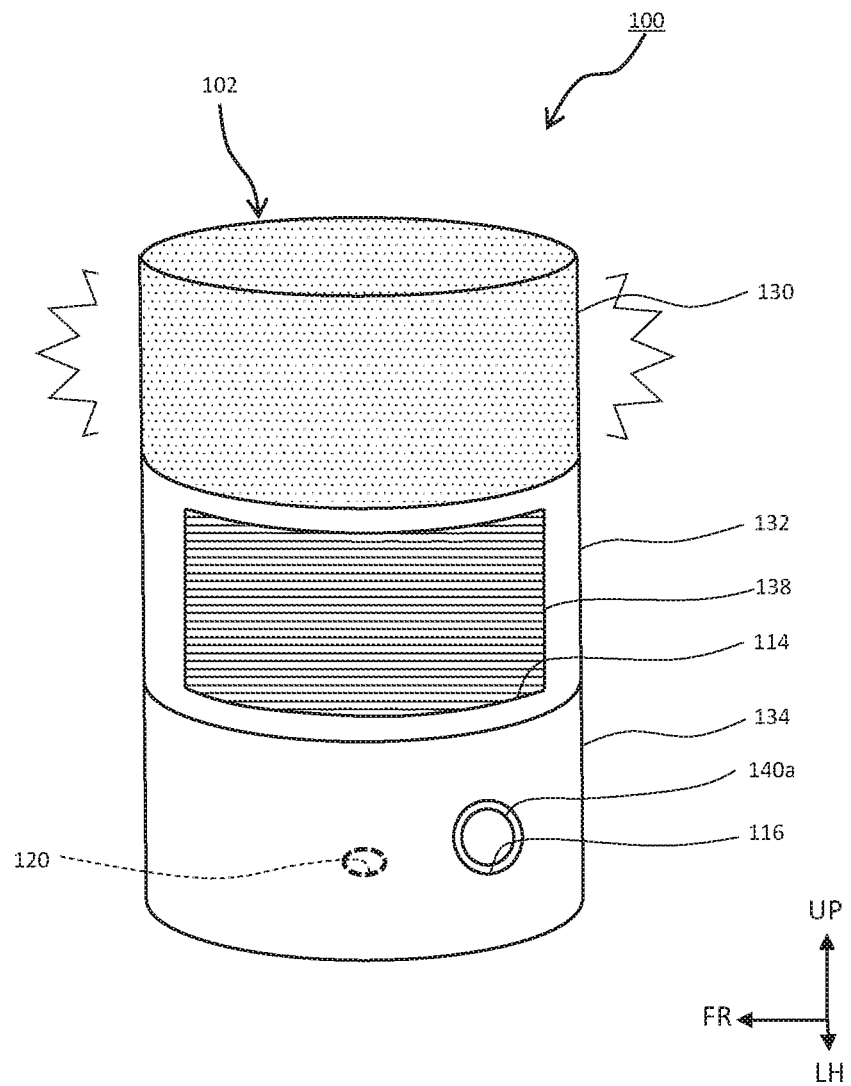
FIG. 5 is a perspective diagram showing an outer appearance of a sensor lamp unit.
Figure 6:
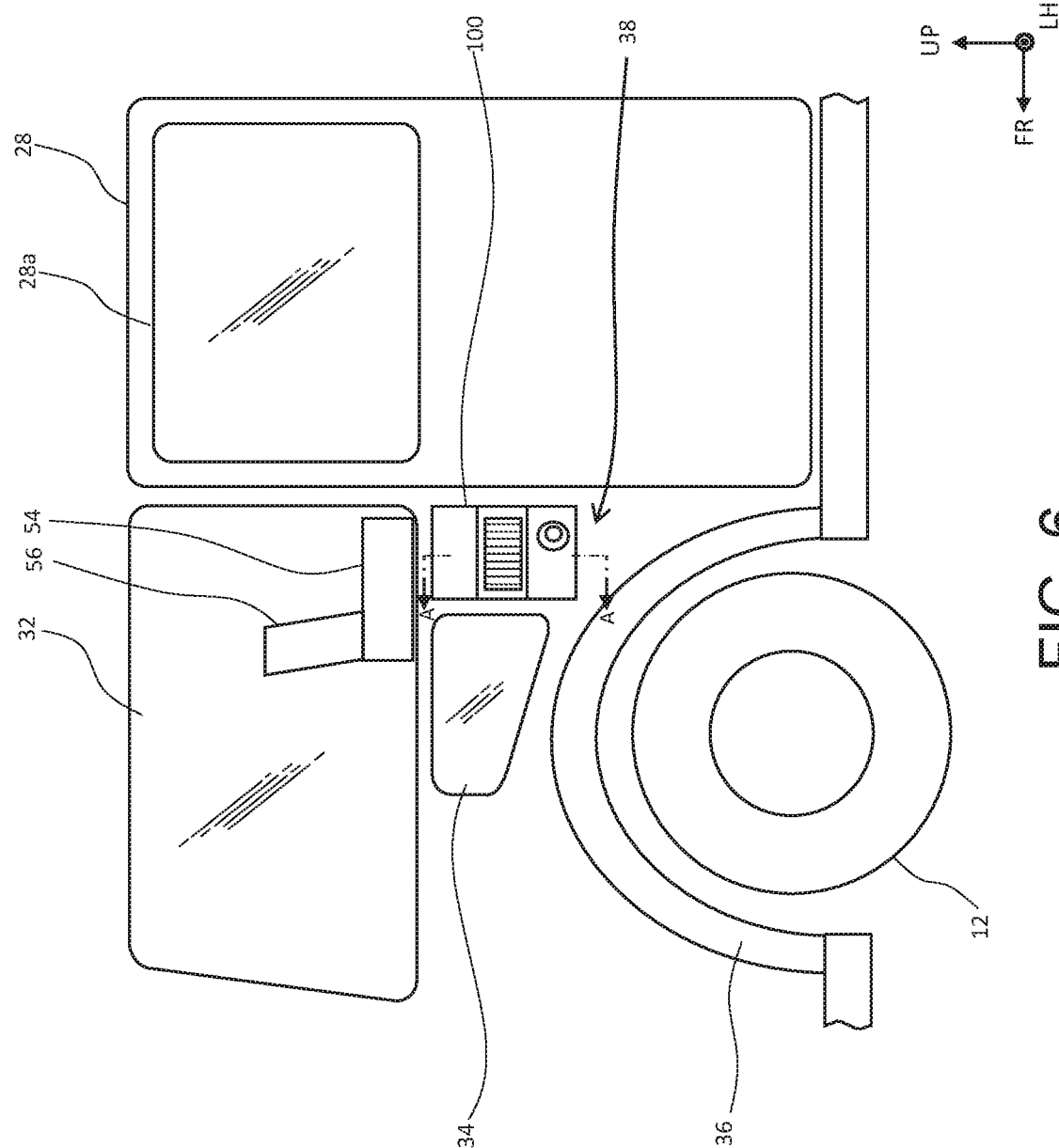
FIG. 6 is a partial side view of the automatic drive vehicle.
Figure 7:
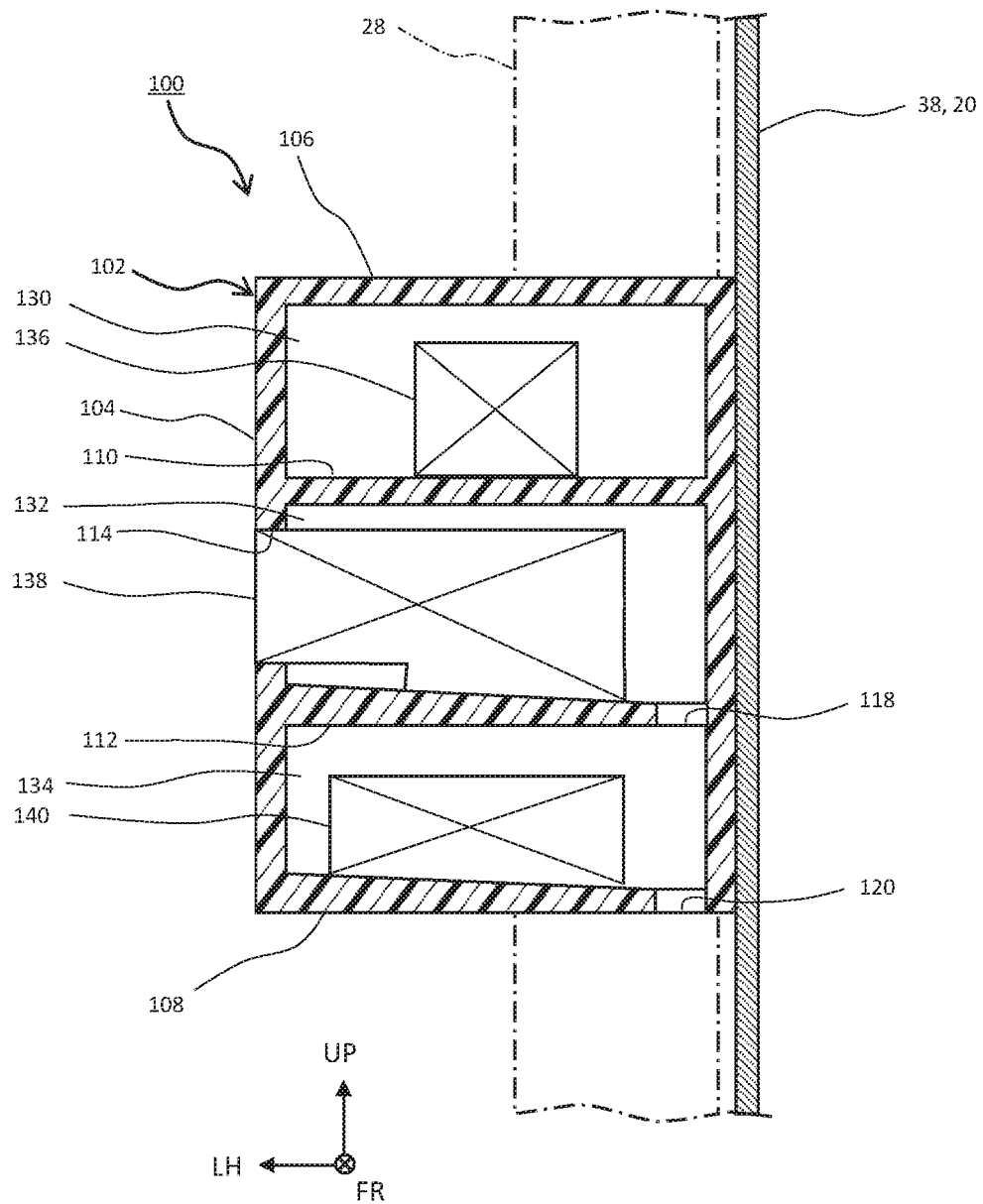
FIG. 7 is a schematic cross sectional diagram along a line A-A of FIG. 6.

Next, with reference to FIGS. 5 to 7, the sensor lamp unit 100 will be described. FIG. 5 is a schematic perspective diagram for explaining an outer appearance of the sensor lamp unit 100. FIG. 6 is a partial side view of the automatic drive vehicle 10. FIG. 7 is a cross sectional diagram along a line A-A in FIG. 5.

The sensor lamp unit 100 has a housing 102 made of a resin. The housing 102 comprises a tube wall 104 formed in an approximate circular tubular shape, an upper wall 106 positioned at an upper end of the tube wall 104 and a lower wall 108 positioned at a lower end of the tube wall 104, and two partitions 110 and 112 positioned at intermediate portions of the tube wall 104 in the up-and-down direction. Alternatively, on the tube wall 104, a flat part for surface-contacting the side wall 20 may be provided. The inside of the housing 102 is divided into three parts by the partitions 110 and 112. An uppermost part of the housing 102 is the turn lamp portion 130 in which a turn lamp 136 is stored, an intermediate portion is the lidar portion 132 in which a lidar 138 is built in, and a lowermost part is the camera portion 134 in which a camera 140 is built in.

The turn lamp 136 is a lamp for indicating directions when the automatic drive vehicle 10 turns left or right, and is formed from, for example, a light emitting diode which emits light of orange color. The turn lamp 136 is also used for lighting of hazard lights.

The lidar 138 is an abbreviation of Laser Imaging Detection and Ranging, and is an active type sensor device which irradiates an electromagnetic wave belonging to a wavelength band of light (ultraviolet ray, visible light, and infrared ray), and detects a reflected wave reflected from an obstacle, to acquire detection data such as a distance to the obstacle and a direction of the obstacle. Some lidars acquire two-dimensional or three-dimensional image data as the detection data by spatially scanning the electromagnetic wave. As the electromagnetic wave, laser light having aligned phases is used. The lidar 138 includes a light emitting device such as a semiconductor laser, a scanning mechanism such as a mirror, a light receiving device, a signal processor circuit, or the like. As shown in FIG. 7, a tip of the lidar 138 is fitted in a through hole 114 formed on the tube wall 104 of the housing 102.

The camera 140 is a passive type sensor device which receives an electromagnetic wave of a wavelength band belonging to visible light, to acquire visible image data. The camera 140 includes an optical mechanism such as a lens, an image sensor such as a CMOS (Complementary Metal Oxide Semiconductor) sensor or a CCD (Charge Coupled Device) sensor, a signal processor circuit, or the like. As shown in FIG. 5, a through hole 116 in which a lens 140*a* of the camera 140 is placed is formed on the tube wall 104 of the housing 102.

In the sensor lamp unit 100, the turn lamp portion 130, the lidar portion 132, and the camera portion 134 are placed in an alignment in the up-and-down direction. When these elements are placed in the up-and-down direction, in addition to suppression of widening in the vehicle front-and-rear direction, the following advantages can be obtained.

The turn lamp portion 130 is provided at the uppermost part of the sensor lamp unit 100. Because the turn lamp portion 130 is provided at the uppermost part, an advantage can be obtained in which the light of the turn lamp 136 can be easily viewed and recognized by vehicles and pedestrians around the vehicle.

The lidar portion 132 and the camera portion 134 are placed adjacent each other in the up-and-down direction, and thus, the lidar 138 and the camera 140 do not block fields of view of each other in the horizontal direction. Because of this, the lidar 138 and the camera 140 can easily detect the obstacle around the vehicle, which is necessary for traveling of the automatic drive vehicle 10.

On the other hand, because the lidar portion 132 is provided at the intermediate part, the lidar 138 has a field of view in the upward direction partially restricted by the turn lamp portion 130 positioned at the upper part, and a field of view in the downward direction partially restricted by the camera portion 134 positioned at the lower part. However, in general, even when a part of the sky and a part of the ground cannot be viewed, there is no effect on the traveling of the automatic drive vehicle 10.

Similarly, because the camera portion 134 is provided at the lowermost part, the camera 140 has a field of view in the upward direction partially restricted by the turn lamp portion 130 and the lidar portion 132 provided at the upper part. However, even when a part of the sky cannot be viewed, there is no effect on the traveling of the automatic drive vehicle 10. Rather, with the camera portion 134 being provided at the lowermost part, there is an advantage that the camera 140 can easily image an area near a lower part of the loading/unloading port 26. For example, by the camera 140 imaging a road surface with high precision to detect a water puddle or unevenness, the automatic drive vehicle 10 can stop at a position where loading and unloading of the passengers can be facilitated or at a position where placement of the ramp is facilitated. In addition, for example, by the camera 140 imaging, with high precision, the steps of the passenger who is loading or unloading or the wheelchair which is loading or unloading, it can be easily checked whether or not the loading and unloading of the passengers are done safely.

The lidar portion 132 and the camera portion 134 are placed close to each other, respectively at the intermediate part and the lowermost part. Because of this, the lidar 138 and the camera 140 can capture any obstacle around the vehicle from approximately the same angle, and the data acquired by the lidar 138 and the data acquired by the camera 140 can be easily integrally or complementarily used. As examples of the integral obstacle detection process, there may be exemplified a process to overlap the detection data acquired by the lidar 138 and the image data acquired by the camera 140 to improve a resolution, a process to detect a characteristic of the obstacle (for example, whether the obstacle is a human or an object, is hard or soft, etc.), and a process to obtain a 3D image using the slight difference in viewing angles. As examples of complementary process, there may be exemplified a configuration in which, when one of the lidar 138 and the camera 140 fails, the data of the other of the lidar 138 or the camera 140 are used in place thereof.

The integral or complementary use of the data by the lidar 138 and the data by the camera 140 also compensate for disadvantages of the lidar 138 and the camera 140. Because the lidar 138 requires a step of irradiating the electromagnetic wave, the lidar 138 tends to have a lower temporal resolution and a lower spatial resolution in comparison to the camera 140. Thus, by combining the data of the camera 140 with the data of the lidar 138, a process which compensates for the low temporal and spatial resolutions of the lidar 138 can be enabled. On the other hand, during the nighttime or the like, an amount of light is reduced, and imaging precision of the camera 140 is consequently reduced, but because the lidar 138 irradiates laser, the lidar 138 can image with a similar precision during the nighttime as during the daytime. Thus, by combining the data of the lidar 138 with the data of the camera 140, a process which compensates for the reduction of the imaging precision of the camera 140 can be enabled.

As shown in FIG. 6, the sensor lamp unit 100 is provided in the region 38. Specifically, the sensor lamp unit 100 is provided in a range which is at the front side in relation to the front end of the front slide door 28 in the open state, below the lower end of the first left front side window 32, at the rear side in relation to the rear end of the second left front side window 34, and above the expanded portion 36 of the fender. The sensor lamp unit 100 is attached on the outer surface of the side wall 20, and extends to an outer side from the side wall 20 (refer also to FIG. 7). Near this area, the expanded portion 36 positioned below the sensor lamp unit 100 is also expanded to an outer side in relation to the other, general elements of the side wall 20. Because of this, both the sensor lamp unit 100 and the expanded portion 36 are in a state of expansion to the outer side. This is effective, for example, for letting a vehicle, a motorcycle, a bicycle, a pedestrian, or the like, passing by the automatic drive vehicle 10, recognize an expanded width of the vehicle width due to the sensor lamp unit 100 and the expanded portion 36. In addition, with the width expanded portions being concentrated, a sophisticated impression of the design can be achieved. In the present embodiment, a thickness of the expanded portion 36 is smaller than a thickness of the sensor lamp unit 100, and there is only a very small influence of the expanded portion 36 on the field of view of the camera 140.

Provision of the sensor lamp unit 100 in the region 38 is also useful in securing a large area for the first left front side window 32 and the second left front side window 34. For example, a case may be supposed in which, in the example configuration shown in FIG. 6, the sensor lamp unit 100 is provided at the position of the second left front side window 34. In this case, in order to secure an attachment height of the sensor lamp unit 100, the lower end of the first left front side window 32 must be moved upward, and, as a consequence, the first left front side window 32 must be formed smaller. In addition, due to reasons on the structure in the vehicle as shown in FIG. 3, the second left front side window 34 cannot be moved forward. Thus, the second left front side window 34 must also be formed smaller. On the contrary, the region 38 is positioned at an area nearer to the rear side than to the center of the arch of the fender (and the expanded portion 36), and a distance in the up-and-down direction to the expanded portion 36 is long. Thus, a space for placing the sensor lamp unit 100 can be more easily secured.

The sensor lamp unit 100 at least partially overlaps the armrest 54 and the touch panel 56, which are the operation portions, as viewed in the front-and-rear direction of the vehicle. Because of this, the field of view of the operator is blocked by the armrest 54 and the touch panel 56, and it is difficult for the operator to view through the first left front side window 32 an area below the front slide door 28 or an area below the front wheel 12. Although the second left front side window 34 is provided below the first left front side window 32, the second left front side window 34 is small, and cannot sufficiently expand the field of view of the operator. However, in the automatic drive vehicle 10, because the sensor lamp unit 100 is provided, detailed image information around the sensor lamp unit 100 can be acquired. In particular, the data imaged by the camera 140 is displayed on the electronic mirror on the display 64, and the operator can comprehensively understand the situation outside of the vehicle while sitting on the operator seat 52. When the operator feels that there is some problem in the image of the electronic mirror, the operator may stand up from the operator seat 52, and can view the outside through the first left front side window 32 or the second left front side window 34.

As shown in FIGS. 5 and 6, in the sensor lamp unit 100, the lens 140a of the camera 140 is attached in an orientation in a slightly rearward direction in relation to the exact lateral direction. In the example configuration of FIGS. 5 and 6, the lens 140a is directed toward the rear by about 20 to 30 degrees from the exact lateral direction, as viewed from a center of the circular tube of the housing 102 of the sensor lamp unit 100. One reason for this configuration is that a camera (not shown) is attached on the front wall 18 of the automatic drive vehicle 10. Because the image of the automatic drive vehicle 10 can be obtained by this camera, the camera 140 of the sensor lamp unit 100 does not need to capture the image of the front of the vehicle. Another reason for the configuration is to enable the camera 140 to more completely image the area near the loading/unloading port 26. By setting the lens 140a in an orientation slightly rearward in relation to the exact lateral direction, the loading/unloading port 26 can be placed near the center side of the field of view of the camera 140, which allows precise imaging of the loading/unloading port 26.

The sensor lamp unit 100 is set in such a manner that the imaging by the camera 140 and the detection by the lidar 138 are not blocked by the front slide door 28. As shown in FIG. 6, the front slide door 28 (and the rear slide door 30) protrudes to the outer side in relation to the other, general surfaces of the side wall 20. However, the sensor lamp unit 100 is thicker than the front slide door 28, and an outer end of the sensor lamp unit 100 reaches to an outer side in relation to the outer surface of the front slide door 28. In the example configuration shown in FIG. 7, the sensor lamp unit 100 has a thickness which is twice or larger than that of the front slide door 28. Because of this, even in a state in which the front slide door 28 is opened and the front slide door 28 is moved to a position closest to the sensor lamp unit 100, sufficient fields of view can be secured for the camera 140 and the lidar 138 in the rear side in the horizontal direction. In addition, the camera 140 can image the outer surfaces of the front slide door 28 and the rear slide door 30 regardless of the open/close states of the front slide door 28 and the rear slide door 30. Thus, safety check around the loading/unloading port 26 can be executed with high precision.

As shown in FIG. 7, the sensor lamp unit 100 is fixed on the outer surface of the side wall 20. The fixation is achieved, for example, by bolt-fastening the housing 102 of the sensor lamp unit 100 to the side wall 20. In reality, the side wall 20 is created by a steel plate, a resin plate, or the like, with a certain thickness, and the bolt or the nut is not exposed in the vehicle cabin.

The housing 102 is made of a resin, and is, for example, a single container formed by first resin-molding two semi-circular tubular elements (a shape in which a circular tube is cut in a plane passing near a center axis), and then joining the two semi-circular tube elements by welding. The turn lamp 136, the lidar 138, and the camera 140 are attached to the single housing 102. On the housing 102, the through holes 114 and 116 are formed toward an outer side. The tip of the lidar 138 is fitted to the through hole 114. The lens 140a of the camera 140 is fitted to the through hole 116. Of these through holes, the through hole 116 is relatively small, and thus, by applying a waterproof treatment, there would be almost no room for rain or the like to enter the housing. On the other hand, because the through hole 114 is relatively large, even if the waterproof treatment is applied, there remains a possibility of entry of water through a gap with the lidar 138. In consideration of this, in the housing 102, a water discharge structure is provided on the lower partition 112 of the lidar portion 132 and the lower wall 108 at a lower part of the camera portion 134.

More specifically, an upper surface of the partition 112 is formed in an inclined shape, higher at the side of the through hole 114, and lower at the side of the side wall 20. At a position where the height of the upper surface of the partition 112 is the lowest, a discharge hole 118 is formed on the partition 112. With this configuration, the water intruding through the gap between the through hole 114 and the lidar 138 flows and falls through the discharge hole 118 to the camera portion 134. Moreover, an upper surface of the lower wall 108 is formed in a shape higher at the side of the through hole 116 and lower at the side of the side wall 20. At a position where the upper surface of the lower wall 108 is the lowest, a discharge hole 120 is formed on the lower wall 108. With this configuration, although unlikely to happen, the water entering through the gap between the through hole 116 and the lens 140a can be discharged through the discharge hole 120 to the outside. In addition, the water flowing from the lidar portion 132 through the discharge hole 118 can also be discharged through the discharge hole 120 to the outside.

In FIG. 7, for simplifying the explanation, the discharge holes 118 and 120 are shown with a very simple structure. In reality, however, in order to prevent entry, of rain water carried by wind or rain water splashed by a vehicle traveling nearby, from the lower side of the lower wall 108, a backflow prevention mechanism is desirably provided on the discharge hole 120. As an example of the backflow prevention mechanism, a configuration may be considered in which a plate which has a role to reflect the backflowing rain water is provided at an upper side in relation to an upper end of the discharge hole 120. As another example of the backflow prevention mechanism, a configuration may be considered in which, when water does not enter through the gap between the through hole 116 and the lens 140a, the discharge hole 118 and the discharge 120 are connected by a tube, a pipe, or the like. When the tube or the pipe is thin to a certain degree, the possibility of entry of the splashed water into the lidar portion 132 can be made very small. In addition, by flowing through the tube or the pipe, further entry of the water entering the lidar portion 132 into the camera portion 134 can be prevented.

Although illustration is omitted in FIG. 7, a through hole is formed on the housing 102 on the side of the side wall 20, and a through hole is also formed on the side wall 20 at a corresponding position. Through these through holes, the turn lamp 136, the lidar 138, and the camera 140 are connected via cables with an ECU (Electric Control Unit), a battery, or the like provided inside the vehicle. The through hole is positioned between the housing 102 and the side wall 20, and by applying a normal waterproof treatment, entry of the rain water or the like into the through hole can be prevented.

In the above description, a configuration is exemplified in which, in the sensor lamp unit 100, two sensor devices, namely, the lidar 138 and the camera 140, are provided, in addition to the turn lamp 136. The lidar 138 is an example of an active type sensor device. The active type sensor device is a device which irradiates an electromagnetic wave, detects a reflected wave thereof, and acquires detection data. No particular limitation is imposed on a wavelength band of the electromagnetic wave. As an active type sensor device other than the lidar 138, a millimeter wave radar which irradiates a millimeter wave and detects the reflected wave may be exemplified. A millimeter wave radar is a radar which uses an electromagnetic wave in a millimeter wavelength band, having a wavelength of 1 mm~10 mm (a frequency of 30~300 GHz). In the millimeter wave radar, by detecting the reflected wave, which is a reflection of the irradiated electromagnetic wave, from an obstacle, a distance to and a direction of the obstacle are detected. The millimeter wave radar comprises a transmission and reception antenna for the millimeter wave, a circuit for signal-processing the millimeter wave, and the like. While the millimeter wave radar has a characteristic that the radar tends to be not affected by fog, rain, snow, or the like, the millimeter wave radar also has a low detection precision of styrene foam or the like having a low reflectivity of the electromagnetic wave.

The camera 140 is an example of a passive type sensor device which uses visible light. The passive type sensor device is a device which does not irradiate an electromagnetic wave, and which detects an external electromagnetic wave to acquire image data. No particular limitation is imposed on a wavelength band of the electromagnetic wave. As a passive type sensor device other than the camera 140, an infrared camera which acquires infrared image data, and an ultraviolet camera which acquires ultraviolet image data may be exemplified. Alternatively, the passive type sensor device may be a stereo camera which has two imaging portions and which acquires three-dimensional image data taking advantage of viewing angles.

Alternatively, in the sensor lamp unit 100, in addition to one active type sensor device and one passive type sensor device, a same or different active type sensor device or a same or different passive type sensor device may be further provided. Alternatively, in the sensor lamp unit 100, in addition to one active type sensor device and one passive type sensor device, another sensor may be provided such as a temperature sensor, a microphone, or the like.

In the above description, the front slide door 28 has a configuration in which, when the front slide door 28 is slid forward and the loading/unloading port 26 is set to the open state, the front end of the front slide door 28 reaches an area near the rear end of the first left front side window 32 and near the sensor lamp unit 100. However, the structure of the door can be suitably changed. For example, the front slide door 28 may have a configuration in which, when the front slide door 28 is slid forward, the front end overlaps the first left front side window 32, or a configuration in which, when the front slide door 28 is slid forward, the front end is positioned at the rear side in relation to the rear end of the first left front side window 32. Alternatively, the front slide door 28 may be constructed as a single slide door, in place of being paired with the rear slide door 30. Alternatively, for example, a slide door and a loading/unloading port may be provided in which, when the slide door is slid forward, the loading/unloading port 26 is set to the closed state, and, when the slide door is slid rearward, the loading/unloading port 26 is set to the open state, and a slide door may be employed in which the slide door is positioned near the sensor lamp unit 100 when the slide door is slid forward. Alternatively, a door of a folding type may be employed in place of the slide-type door.

Figure 8:
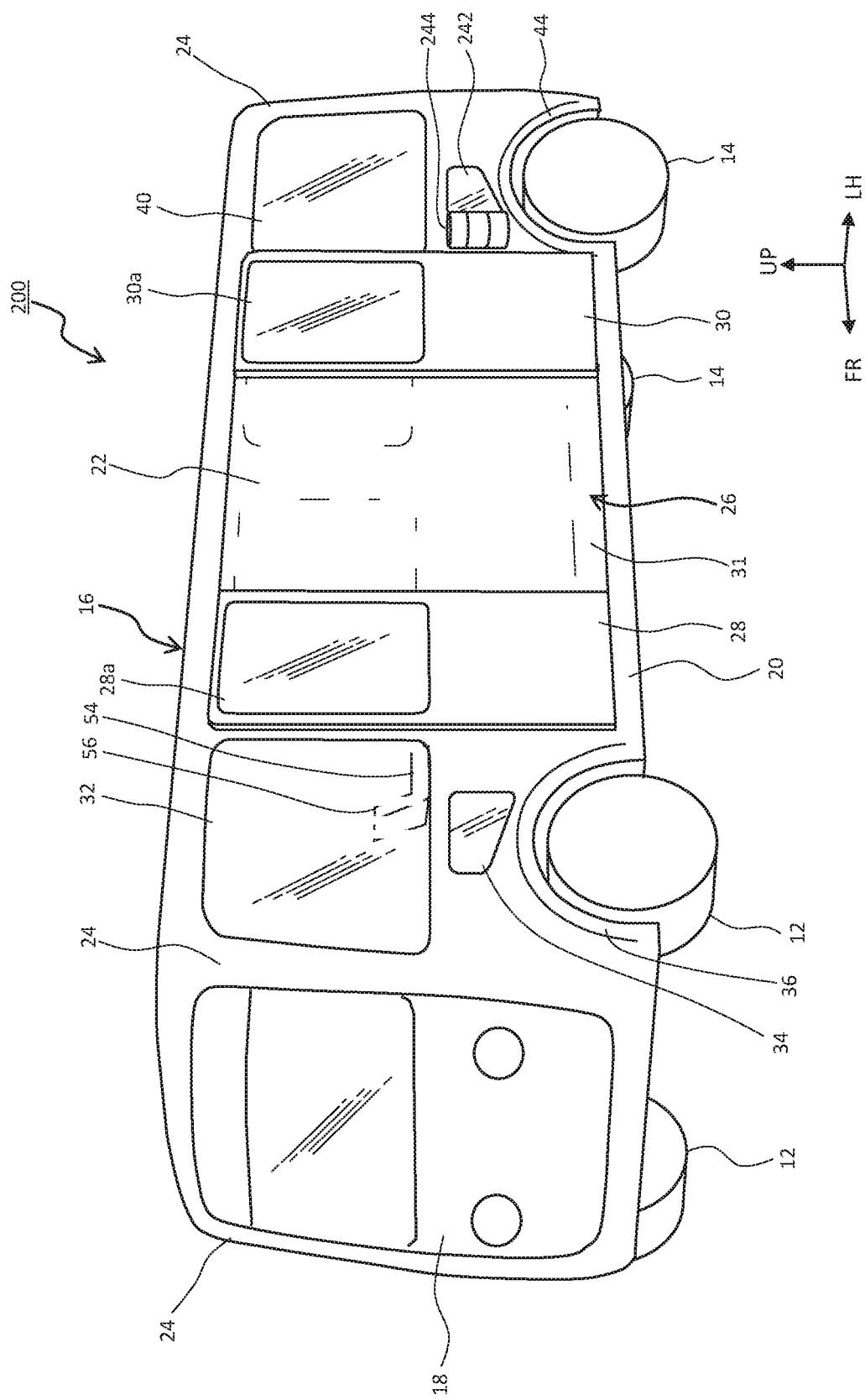
FIG. 8 is a perspective diagram of an automatic drive vehicle according to another embodiment of the present disclosure.

In the above description, the sensor lamp unit 100 is described as being provided on both sides on the front part of the automatic drive vehicle 10. Alternatively, the sensor lamp unit 100 may be provided at other positions. FIG. 8 is a perspective diagram of an automatic drive vehicle 200 according to an alternative embodiment. FIG. 8 corresponds to FIG. 2, and the same or corresponding structures are assigned the same reference numerals. In the automatic drive vehicle 200 shown in FIG. 8, unlike the automatic drive vehicle 10 shown in FIG. 2, the sensor lamp unit 100 is not provided on the front part of the vehicle. In the automatic drive vehicle 200, a second left rear side window 242 is provided having a smaller shape than the second left rear side window 42 of the automatic drive vehicle 10, and having the front end positioned further rearward than the front end of the second left rear side window 42 of the automatic drive vehicle 10. The second left rear side window 242 is formed in a shape and a size which are symmetric in the front-and-rear direction with the second left front side window 34. A sensor lamp unit 244 is provided between the second left rear side window 242 and the rear slide door 30. In the sensor lamp unit 244, the camera is placed in an orientation slightly toward the front side in relation to the exact lateral direction, so as to enable easy imaging of the rear slide door 30. Similarly, in the automatic drive vehicle 200, the sensor lamp unit 244 is provided on the right side wall 22, also at a rear part.

In the above description, the sensor lamp unit 100 is described as having a single housing 102 (that is, an integrally molded housing or a housing formed to be difficult to separate by integration with welding, an adhesive, or the like). With this configuration, for example, the waterproof capability or the like can be improved. Alternatively, the sensor lamp unit 100 may be formed in a separable form such as, for example, a sensor lamp unit 100 formed by bolt-fastening a housing having the turn lamp 136, a housing having the lidar 138, and a housing having the camera 140. In this case, the maintenance of the turn lamp 136 can be facilitated.

In the above description, as the automatic drive vehicle 10, a bus is considered. However, the usage of the automatic drive vehicle 10 is not particularly limited. For example, the automatic drive vehicle 10 may be used as a movable business space, or may be used as a shop for a store which displays and sells various goods, or for a restaurant where food and drink are prepared and provided. Alternatively, the automatic drive vehicle 10 may be used as an office for clerical work, meetings with clients, or the like. Further alternatively, the usage scene of the automatic drive vehicle 10 is not limited to business, and the automatic drive vehicle 10 may be used as, for example, a personal movement apparatus of an individual. Furthermore, the traveling pattern and the vehicle speed of the automatic drive vehicle 10 may be suitably changed.

The invention claimed is:

1. A sensor lamp unit for an automatic drive vehicle, comprising:
  a passive type sensor device that detects an electromagnetic wave from outside and that acquires image data;
  an active type sensor device that detects a reflected wave of an electromagnetic wave which is irradiated, and that acquires detection data; and
  a turn lamp, wherein:
  the passive type sensor device, the active type sensor device, and the turn lamp are placed and aligned in an up-and-down direction, and are attached on an outer surface of each of left and right side walls of the vehicle; and
  the automatic drive vehicle comprises:
    a first front side window provided at an upper part of each of the left and right side walls;
    a second front side window provided on each of the left and right side walls, at a position below a lower end of the first front side window, and at a front side in relation to a rear end of the first front side window; and
    a slide door provided on at least one of the side walls and which slides in a front-and-rear direction, and
    the sensor lamp unit is provided, on the side on which the slide door is provided, at a position below the lower end of the first front side window, at a rear side in relation to a rear end of the second front side window, and at a front side in relation to a front end of the slide door when the slide door is slid forward.

2. The sensor lamp unit for the automatic drive vehicle according to claim 1, wherein:
  the automatic drive vehicle further comprises:
    a first rear side window provided at an upper part of each of the left and right side walls; and
    a second rear side window provided on each of the left and right side walls, at a position below a lower end of the first rear side window, and at a rear side in relation to a front end of the first rear side window, and the sensor lamp unit is provided, on the side on which the slide door is provided, at a position below the lower end of the first rear side window, at a front side in relation to a front end of the second rear side window, and at a rear side in relation to a rear end of the slide door when the slide door is slid rearward.

3. The sensor lamp unit for the automatic drive vehicle according to claim 1, wherein
a fender having an expanded portion formed in an arch shape along an outline of a wheel is provided on the side wall, below the second front side window or the second rear side window, and
the sensor lamp unit is provided above the expanded portion.

4. The sensor lamp unit for the automatic drive vehicle according to claim 1, wherein
an operation portion for an operator is provided inside the automatic drive vehicle, near the first front side window on the side wall on which the slide door is provided, and
the sensor lamp unit is provided at a position which at least partially overlaps the operation portion in the front-and-rear direction of the vehicle.

5. The sensor lamp unit for the automatic drive vehicle according to claim 1, wherein
the passive type sensor device is a camera which acquires visible image data, and is provided at a position where an outer surface of the slide door can be imaged, on a side, of the automatic drive vehicle, on which the slide door is provided.

6. The sensor lamp unit for the automatic drive vehicle according to claim 1, wherein
the turn lamp is provided at an uppermost part,
the passive type sensor device is provided at a lowermost part, and
the active type sensor device is provided at an upper part adjacent the passive type sensor device.

7. The sensor lamp unit for the automatic drive vehicle according to claim 1, wherein
the sensor lamp unit comprises a single housing.

8. The sensor lamp unit for the automatic drive vehicle according to claim 7, wherein
a discharge hole for discharging water entering through a gap between the active type sensor device and the housing is formed on the housing.

9. The sensor lamp unit for the automatic drive vehicle according to claim 1, wherein
the passive type sensor device is a camera which acquires visible image data for an electronic mirror in the automatic drive vehicle.

10. The sensor lamp unit for the automatic drive vehicle according to claim 1, wherein
the image data acquired by the passive type sensor device and the detection data acquired by the active type sensor device are integrated and used for a detection process of an obstacle around the vehicle.

11. An automatic drive vehicle comprising:
a sensor lamp unit comprising a passive type sensor device, an active type sensor device, and a turn lamp, the passive type sensor device detects an electromagnetic wave from outside and that acquires image data, the active type sensor device detects a reflected wave of an electromagnetic wave which is irradiated, and that acquires detection data, the passive type sensor device, the active type sensor device, and the turn lamp are placed and aligned in an up-and-down direction, and are attached on an outer surface of each of left and right side walls of the vehicle;
a first front side window provided at an upper part of each of the left and right side walls;
a second front side window provided on each of the left and right side walls, at a position below a lower end of the first front side window, and at a front side in relation to a rear end of the first front side window; and
a slide door provided on at least one of the side walls and which slides in a front-and-rear direction, and
wherein the sensor lamp unit is provided, on the side on which the slide door is provided, at a position below the lower end of the first front side window, at a rear side in relation to a rear end of the second front side window, and at a front side in relation to a front end of the slide door when the slide door is slid forward.

12. The automatic drive vehicle according to claim 11 further comprising:
a first rear side window provided at an upper part of each of the left and right side walls; and
a second rear side window provided on each of the left and right side walls, at a position below a lower end of the first rear side window, and at a rear side in relation to a front end of the first rear side window, and
the sensor lamp unit is provided, on the side on which the slide door is provided, at a position below the lower end of the first rear side window, at a front side in relation to a front end of the second rear side window, and at a rear side in relation to a rear end of the slide door when the slide door is slid rearward.

13. The automatic drive vehicle according to claim 11, wherein
a fender having an expanded portion formed in an arch shape along an outline of a wheel is provided on the side wall, below the second front side window or the second rear side window, and
the sensor lamp unit is provided above the expanded portion.

14. The automatic drive vehicle according to claim 11, wherein
an operation portion for an operator is provided inside the automatic drive vehicle, near the first front side window on the side wall on which the slide door is provided, and
the sensor lamp unit is provided at a position which at least partially overlaps the operation portion in the front-and-rear direction of the vehicle.

15. The automatic drive vehicle according to claim 11, wherein
the passive type sensor device is a camera which acquires visible image data, and is provided at a position where an outer surface of the slide door can be imaged, on a side, of the automatic drive vehicle, on which the slide door is provided.

16. The automatic drive vehicle according to claim 11, wherein
the turn lamp is provided at an uppermost part,
the passive type sensor device is provided at a lowermost part, and
the active type sensor device is provided at an upper part adjacent the passive type sensor device.

17. The automatic drive vehicle according to claim 11, wherein
the sensor lamp unit comprises a single housing.

18. The automatic drive vehicle according to claim 17, wherein a discharge hole for discharging water entering through a gap between the active type sensor device and the housing is formed on the housing.

19. The automatic drive vehicle according to claim 11, wherein the passive type sensor device is a camera which acquires visible image data for an electronic mirror in the automatic drive vehicle.

20. The automatic drive vehicle according to claim 11, wherein the image data acquired by the passive type sensor device and the detection data acquired by the active type sensor device are integrated and used for a detection process of an obstacle around the vehicle.

* * * * *